Figure 1:
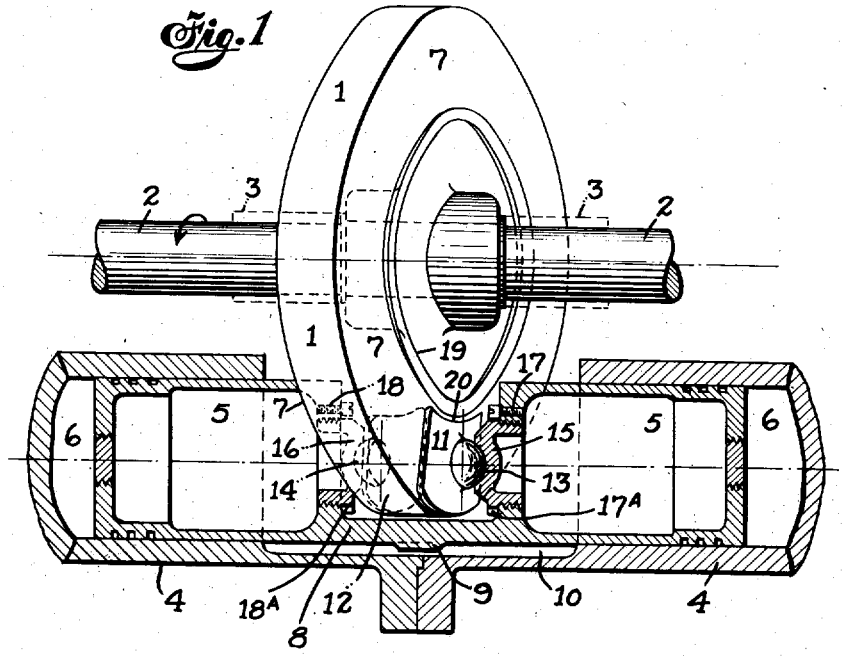

Feb. 5, 1924. Re. 15,756

A. G. M. MICHELL

MECHANISM FOR THE INTERCONVERSION OF RECIPROCATING AND ROTARY MOTION

Original Filed June 11, 1918 3 Sheets-Sheet 1

INVENTOR
ANTHONY G. M. MICHELL
BY
E. W. Marshall
ATTORNEY

Feb. 5, 1924. Re. 15,756

A. G. M. MICHELL

MECHANISM FOR THE INTERCONVERSION OF RECIPROCATING AND ROTARY MOTION

Original Filed June 11, 1918 3 Sheets-Sheet 2

INVENTOR
ANTHONY G. M. MICHELL
BY
E. W. Marshall
ATTORNEY

Feb. 5, 1924. Re. 15,756

A. G. M. MICHELL

MECHANISM FOR THE INTERCONVERSION OF RECIPROCATING AND ROTARY MOTION

Original Filed June 11, 1918 3 Sheets-Sheet 3

INVENTOR
ANTHONY G. M. MICHELL
BY
E. W. Marshall
ATTORNEY

Reissued Feb. 5, 1924.

Re. 15,756

UNITED STATES PATENT OFFICE.

ANTHONY GEORGE MALDON MICHELL, OF MELBOURNE, VICTORIA, AUSTRALIA, ASSIGNOR TO CRANKLESS ENGINES, (AUS) PROPRIETARY LIMITED, OF MELBOURNE, VICTORIA, AUSTRALIA.

MECHANISM FOR THE INTERCONVERSION OF RECIPROCATING AND ROTARY MOTION.

Original application filed June 11, 1918, Serial No. 239,384. Renewed April 28, 1921, Serial No. 465,243. Original No. 1,409,057, dated March 7, 1922. Application for reissue filed October 31, 1923. Serial No. 671,845.

*To all whom it may concern:*

Be it known that I, ANTHONY GEORGE MALDON MICHELL, a subject of the King of Great Britain, residing at No. 450 Collins Street, Melbourne, in the State of Victoria, Australia, have invented certain new and useful Improvements in Mechanism for the Interconversion of Reciprocating and Rotary Motion, of which the following is a specification.

The object of this invention is an improved means of obtaining harmonic reciprocating motion from uniform rotary motion or vice versa, applicable to steam and other heat engines, compressors for air and gas, and pumps, as well as to other machines in which the interconversion of these two types of motion is required.

The invention consists essentially in the combination of a reciprocating element or elements, with a rotating drive plate, or swash plate, and one or more slippers of special construction as hereinafter described forming connecting elements between the said reciprocating and rotary elements.

The employment of a swash plate or drive plate in mechanism for the purpose stated is well known and it has been customary to employ wheels or rollers to make contact with a minimum of friction between the reciprocating element and the drive plate. More recently ball races have been employed for effecting the connection stated and it has also been proposed to use slide blocks having plane surfaces making lubricated contact with the drive plate and rotating about axes parallel to the line of motion of the reciprocating element. Such devices, however, have not proved suitable for operation with intense pressures and high speeds, and consequently although mechanism of this class has been successfully employed for the operation of hydraulic pumps and motors, it has not hitherto been suitable for use in conjunction with engines and compressors.

The accompanying drawings illustrate a practical and the preferred form of drive plate mechanism according to this invention, and its application to a reciprocating engine.

Figure 2:
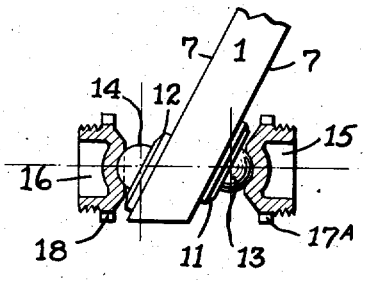
Figure 3:
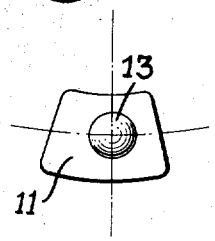
Figure 4:
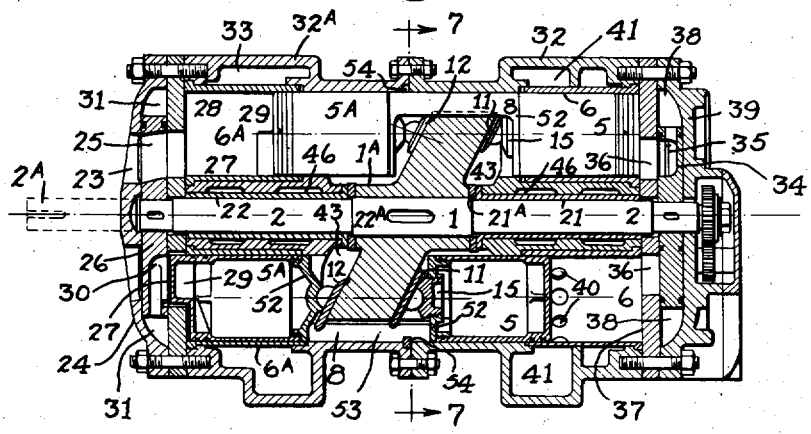
Figure 5:
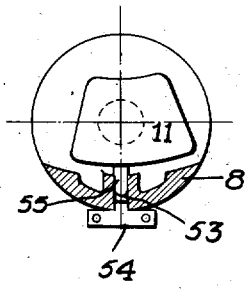
Figure 6:
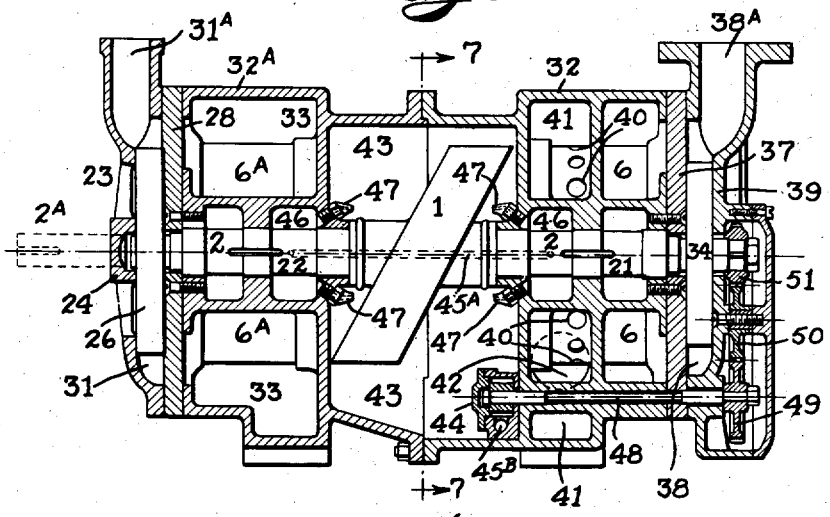
Figure 7:
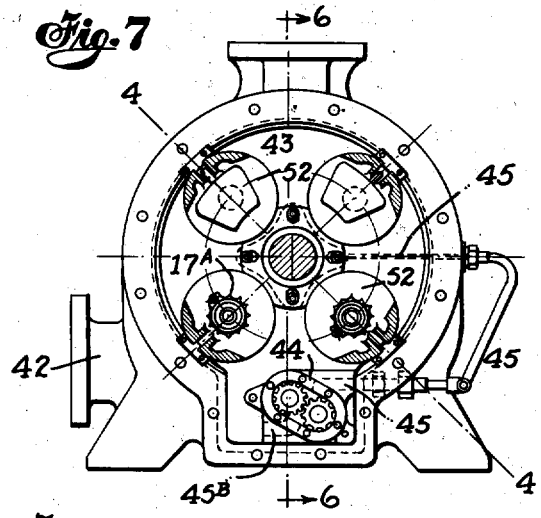
Figure 8:
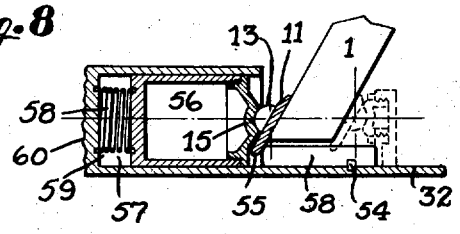

Figs. 1, 2 and 3 illustrate the essential parts of the invention as applied to double-acting piston;

Fig. 1 being a longitudinal section through a cylinder and its piston parallel to the axis of rotation of the drive plate;

Fig. 2 a detail showing portion of the drive plate and the slippers in another position; and Fig. 3 a plan view of one of the slippers;

Figs. 4, 5, 6, 7 and 8 illustrate one method of application of the invention to a complete machine, viz: a self-contained steam-driven air compressor, Figs. 4 and 6 being axial sections respectively on the lines 4—4 and 6—6, of Fig. 7, Fig. 5 an enlarged detail, Fig. 7 a cross-section on the line 7—7 of Figs. 4 and 6 with parts removed; and Fig. 8 a detail view showing alternative constructions.

In Fig. 1 the drive plate 1 is shown mounted obliquely on the rotating shaft 2 which revolves in the bearings 3, 3 indicated by dotted lines. One of the working cylinders 4, 4 of an engine or compressor, whose axis is parallel to that of the shaft 2, is shown in longitudinal section together with the double-ended piston 5, 5, the working chambers 6, 6 of the cylinders being between the outside ends of the double piston 5, 5 and the closed ends (not shown) of the cylinders.

The drive plate 1 has the form of an oblique section or slice of a circular cylinder having truly plane and parallel working surfaces 7, 7. The plate is rigidly mounted upon and revolves with the shaft 2.

The double-ended piston 5, 5 is constructed in any usual manner suitable for the fluid with which it is to operate. The two ends of the double piston are rigidly connected together by the central bar 8 which may have a projection 9 moving in a slot 10 formed either in the central portion of the double cylinder 6, 6 as shown, or in the frame of the engine so as to prevent the piston from rotating while allowing it to reciprocate parallel to its axis.

In order to transmit motion from the drive plate 1 to the pistons 5, 5 or vice versa, two slipper blocks 11, 12 are arranged one on each side of the drive plate 1 as shown having plane working surfaces adapted to make lubricated contact with the corresponding plane surfaces 7, 7 of the drive plate, and in order to enable the slippers 11, 12 to follow the varying direction of inclination of the latter surfaces to the axis of the piston as the drive plate rotates, they are furnished with universal joints connecting them to the piston 5, 5. The universal joints may conveniently take the form of spherical bosses 13, 14 upon the slippers 11, 12, such bosses fitting into hollow spherical seats in the cups 15, 16 secured to the piston 5, 5. In Fig. 1 the drive plate 1 and slippers 11, 12 are shown in such a position that the normal lines to their plane working surfaces have the maximum obliquity to the plane of the drawing. In Fig. 2 a portion of the periphery of the drive plate 1 and the slippers 11, 12 are shown in the position corresponding to rotation through 90° from the position shown in Fig. 1, the normal lines to the working surfaces being then turned into the plane of the drawing. In order to adjust the working clearance which is necessary to allow efficient lubrication without undue play between the slippers 11, 12 and the working faces 7, 7 of the drive plate 1, the cups 15, 16 are constructed with fine threads and screwed into the pistons 5, 5, the adjustment being made permanent by means of set screws 17, 18 engaging with the peripheral notches 17ª and 18ª in the cups 15, 16.

When the drive plate 1 revolves invariably or usually in one direction, the slippers 11, 12 are preferably made as shown in Fig. 3 with their bosses 13, 14 slightly behind the centres of the plane working surfaces of the slippers. The slippers will then operate so as to allow wedge-shaped films of lubricant to be formed between their working surfaces and those of the drive plate in a manner which is now well understood. For the same purpose these slippers 11, 12 are also preferably constructed with relatively weak or flexible portions on the leading or on both the leading and trailing sides of the plate portions which make contact with the drive plate. In order to prevent the slippers 11, 12 from revolving about the axis of the piston 5, 5 as the drive plate 1 revolves, the latter may be furnished with a projecting eccentric guide ring 19 shaped so as to fit approximately the inner edge 20 of the slipper 11, a similar guide ring being formed on the opposite side of the drive plate 1 to form a similar guide for the slipper 12.

Alternatively to the construction of the slippers with spherical bosses fitting in concave seats attached to the pistons as above described, the pistons may be fitted with spherical projections fitting in concave seats in the slippers. Or the slippers and pistons may be connected by universal joints of other suitable types as, for instance, with the well known Hooke's or Cardan's joints, the essential purpose being to allow the slippers to change the inclination of their working faces in every direction while maintaining the perpendicular distance between those working faces constant, or approximately constant.

In the example of the application of the invention illustrated in Figs. 4, 5, 6 and 7, a single-acting steam cylinder 6 and single-acting compressor cylinder 6ª are arranged in axial alinement and opposed to one another, four such pairs of cylinders being set symmetrically around the circumference of the machine as shown in Fig. 7. In each pair of cylinders a double piston, consisting of a steam end 5 and an air end 5ª connected by a central bar 8 is arranged substantially as already described in connection with Figs. 1 and 2. The steam and air ends of the double piston are shown in the drawings of equal diameters but may be of different diameters adapted to the working pressures of the two fluids. Each double piston is provided with slipper blocks 11, 12 as already described, making working contact with a drive plate 1 rigidly mounted on the shaft 2 which extends through the whole length of the combined machine being mounted in bearings 21, 22.

The drive plate 1 is preferably constructed with a cylindrical boss 1ª, integral with a plate portion having the form of an oblique slice of a cylinder, and thrust rings 21ª, 22ª are interposed between the boss 1ª and the bearings 21 and 22 to take any unbalanced axial force acting on the drive plate.

Air enters the compressor cylinder 6ª during the forward movement of the piston 5ª through the open end 23 of the end cover 24 being admitted through the port 25 of the rotating valve 26 mounted on the shaft 2 when such port registers with either of the four admission ports 27 in the plate 28 which covers the otherwise open ends of the air cylinders 6ª. On the return strokes of the pistons 5ª, compressed air is delivered through the same ports 27 and the port 30 of the rotating valve 26 into the annular chamber 31 in the end cover 24 from which it is discharged through the pipe branch 31ª (Fig. 6). To minimize clearance the pistons 5ª are furnished with projections 29, approximately fitting the ports 27.

The cylinders 6ª may be formed as liners, as shown, being inserted in the common casing 32ª, and may be surrounded by a water jacket 33, for cooling purposes.

A similar casing 32, which may be bolted to the casing 32ª as shown, on the line 7—7 contains the steam cylinders 6, also formed as liners. The steam ends of these cylinders are controlled by a rotating valve 34 having an admission port 35 which registers in succession with the four admission ports 36 in the plate 37 covering the otherwise open ends of the cylinders 6. Steam, supplied through the pipe branch 38ª (Fig. 6) is admitted through the ports 35 and 36 from the chamber 38 in the end cover 39. The steam cylinders illustrated are arranged on the "uniflow" principle and the exhaust from each cylinder takes place through a ring of ports 40 into an annular exhaust steam chamber 41 formed in the casing 32 and connected with the exhaust branch 42 (Figs. 6 and 7).

The drive plate 1 is enclosed in a central chamber 43 formed by the open inner ends of the casings 32 and 32ª and is provided with means for forced lubrication from the oil pump 44 (Fig. 7) which delivers jets of oil through the passages, 45 45ª, bearing chambers 46 and nozzles 47 against the central portions of the plate 1, from which the oil is thrown outwardly by centrifugal force over the working surfaces on which the slipper blocks 11 and 12 make contact, and thence returns to the suction branch 45ᵇ on the pump 44 in the lower part of the chamber 43 (Figs. 6 and 7). The pump 44 may be driven through a spindle 48 and gear wheels 49, 50 from a pinion 51 mounted on the main shaft 2. In order to prevent the slippers 11 from rotating about their axial centre-lines the means shown in Fig. 5 may be employed as alternatives to the projection 9 on the bar 8, and rings 19 on drive plate 1, as shown in Fig. 1. As shown in Figs. 4 and 5 rotation of the pistons 5, 5ª is restrained by the bar 8 which consists of the bridge portion of the yoke piece 52 to which are screwed the said pistons 5, 5ª, and the cups 15, and the bar 8 is slotted at 53 so as to be guided longitudinally by the stud piece 54 fixed to the casing 32ª, and engaging with the slot 53. A ball-ended projection 55 from the slipper 11, also engages with the slot 53, and the slipper 11 is thus prevented from revolving though free to oscillate according to the varying direction of inclination of its surface to contact with the plate 1.

An engine constructed as herein described, with either three, four (as shown), or any greater number of pistons spaced equidistantly around the circumference of the drive plate, admits of perfect dynamic balance in all directions so as to communicate no vibration to its foundation, provided that the masses of the drive plate and reciprocating pistons are correctly adjusted. For this purpose it is necessary that all the pistons, if equidistant, from the axis, shall be of equal mass, and that the mass of that portion of the drive plate outside the boss which portion may be regarded as an oblique slice of a cylinder is determined by the algebraical formula $$M = 2nm\frac{A^2}{R^2 + r^2}$$

in which M is the mass of the drive plate; $n$ the number and $m$ the mass of each of the pistons with its attachment; R the radius of the outer surface of the drive plate measured normally to the axis; $r$ the radius of the boss of the drive plate; and A the distance between the axis of the drive plate and that of one of the pistons. The "boss" in this formula is the axially symmetrical part of the drive plate, or the dynamically balanced part thereof, and in so far as this formula is concerned may be an integral part of the drive plate as shown, or of the shaft, or may be the shaft itself. The rotary valves, and other rotating parts, are independently balanced in the usual manner.

It is to be understood that the invention is not limited to the use of one or more double-ended pistons as described above, but that the construction which is the essence of the invention can be employed with a single-ended piston and one slipper, or with a single-ended piston having an extension to the opposite side of the drive plate from the piston for the purpose of carrying a second slipper. These constructions are illustrated in Fig. 8 in which the single-ended piston 56 reciprocates in the cylinder 57, and is fitted with a slipper 11 coacting with a drive plate 1 as already described. A yoke piece 58 attached to the cylinder 57 is slotted to receive the ball 55, attached to the slipper and stud 54 attached to the casing 32 as already described. In order to assist the piston 56 in making its return stroke a compression spring 59 may be inserted between it and the closed end 60 of the cylinder 57. In certain cases the spring 59 may be omitted the return motion of the piston being actuated either by the pressure of the working fluid or by the adhesion of the oil-film between the slipper 11 and drive plate. 1. In the latter case the slipper must be positively attached to the piston by a Hooke's or Cardan joint as hereinbefore indicated.

It will also be understood that for special purposes the essential features of the invention may be applied to a swash plate having two plane, but not parallel, working faces in conjunction with single-ended pistons as above described in connection with Fig. 8 of which one or more are fitted with slippers co-acting with one working face, while another or others co-act with the other working face of the swash plate. By this means the single-acting pistons on one side of the drive plate have working strokes of a certain length, while the strokes of those on the other side have a different length.

By an alternative arrangement, the spring 59 being omitted, the yoke piece 58 may be extended, as shown in dotted lines in Fig. 8, and arranged to carry a second slipper 12 (also dotted in Fig. 8) on the opposite side of the drive plate 1, the action of the two slippers being then precisely as already described in connection with Figs. 4, 5, 6 and 7.

It will further be understood that the details of construction may be modified for the use of the mechanism as in conjunction with a steam or internal combustion engine, pump, or compressor whether double-acting or single-acting, instead of as a combined engine and compressor as above described. For uses in conjunction with these machines other than those last mentioned the shaft 2 would be extended outside the casing as indicated at $2^a$, Figs. 4 and 6 and would be fitted with a coupling, pulley, or the like by which the power developed by, or applied to, the drive plate 1, would be transmitted.

What I claim is:

1. In mechanism of the character described, the combination of a swash plate, a reciprocable element, and a slipper of the oil film lubricating type quaquaversally articulated to said reciprocable element so as to permit the working surface of said plate and said slipper to co-act.

2. Mechanism for the purpose stated, comprising a rotary swash plate, a reciprocable element, a connection between said element and the swash plate embodying a slipper having a working face to cooperate with a working face of the swash plate, the slipper being non-rotatable about an axis parallel to the direction of movement of the reciprocable element, a universal joint connecting the slipper with the reciprocable element, and means for maintaining the slipper in cooperative working relation with the working face of the swash plate.

3. Mechanism for the purpose stated, comprising a rotary swash plate having opposite truly plane working faces disposed obliquely relatively to the axis of revolution of the swash plate, a reciprocable element, and a pair of plane surfaced slippers having articulated connections with said reciprocable elements, and means for preventing rotation of the slipper about an axis parallel to the direction of movement of the reciprocable element, said slippers bearing respectively on the opposite faces of the swash plate.

4. In mechanism for the purpose stated, the combination with a swash plate having two plane and parallel working faces, of a reciprocable element having a pair of opposed slippers having plane working faces cooperating with the respective working faces at opposite sides of the swash plate, each slipper being capable of articulated movement but non-rotatable relatively to the reciprocable direction of movement of the element while maintaining the perpendicular distance between their working faces substantially constant.

5. Mechanism for the purpose stated consisting of the combination with a swash plate, of reciprocable elements disposed symmetrically about said plate and effecting dynamic balance therewith, and a pair of plane surfaced articulated connecting slippers between each of said elements and the swash plate, said slippers having means for preventing rotation thereof about an axis parallel to the direction of movement of said reciprocable elements.

6. In mechanism of the character described, the combination of a rotary swash plate having a plane working surface, a plane surfaced slipper cooperative therewith, a reciprocable element, a universal joint connecting the slipper to the reciprocable element, and means for holding said slipper from rotation relatively to the reciprocable element about an axis parallel to the direction of movement of said element.

7. In mechanism of the character described, the combination with a swash plate, a reciprocable element, a plane surfaced slipper cooperative with the swash plate and having an articulated connection with said reciprocable element, and means for restraining rotation of the slipper element relatively to the reciprocable element but permitting reciprocation of the latter.

8. In mechanism for the purpose stated, a casing containing the swash plate with means including a pump driven from the shaft of the latter and jets directed toward the swash plate for effecting forced feed lubrication to the working faces of the same.

9. In mechanism for the purpose stated, in combination, a swash plate, a reciprocable element comprising a piston carrying a slipper element articularly connected thereto at a point offset in rear of the leading end of the slipper element to produce an interposed wedge-shaped lubricant film connection between said plate and the slipper element and means for projecting a lubricant against the working face of the swash plate.

10. In mechanism for the purpose stated, a swash plate, reciprocable elements symmetrically balanced about a swash plate having truly plane working faces, said elements comprising pistons each carrying an articulated slipper arranged to effect lubricated contact with said working surfaces, said pistons and slippers being restrained from rotation, and means driven from the shaft of said plate for effecting forced lubrication to said working faces.

11. Mechanism of the character described comprising a swash plate, reciprocable elements disposed with angular symmetry about said plate and arranged to effect dynamic balance therewith and a connecting slipper between each of said elements and the swash plate, each of said slippers having an articulated connection with its reciprocable element.

12. Mechanism of the character described comprising a rotary shaft, a member rotatable with the shaft having a working surface oblique to the axis of rotation thereof thereby being out of dynamic balance, at least three elements reciprocable in paths substantially parallel with the axis of the shaft disposed with angular symmetry about the shaft, said elements being of such mass and so positioned as to counteract the unbalance of said member, and operative connections between the member and said elements.

13. Mechanism of the character described comprising a shaft, a drive plate thereon, at least a part of said drive plate being in the form of an oblique slice of a cylinder and out of dynamic balance, a plurality of elements of equal mass reciprocable in paths parallel with the axis of the shaft equidistant from said axis, disposed with angular symmetry about the shaft, and operative connections between the drive plate and said elements, the various parts of said combination being characterized by the proportions $$M = 2nm\frac{A^2}{R^2 + r^2}$$

in which M is the mass of the dynamically unbalanced part of the drive plate, $n$ is the number of the elements, $m$ is the mass of an element and its connections, A is the distance of the center of the mass of an element and its connections from the axis of the shaft, R is the radius from the axis of the shaft to the periphery of the drive plate normal to said axis, and $r$ is the radius of the shaft or of the dynamically balanced part of the drive plate.

ANTHONY GEORGE MALDON MICHELL.